US008863083B2

(12) United States Patent
McKellar et al.

(10) Patent No.: US 8,863,083 B2
(45) Date of Patent: Oct. 14, 2014

(54) PRESENTING USER INTERFACES BASED ON MESSAGES

(75) Inventors: Brian McKellar, Heidelberg (DE); Ivan Perelomov, Walldorf (DE); Artem Gratchev, Mannheim (DE)

(73) Assignee: SAP AG, Walldorf (DE)

( * ) Notice: Subject to any disclaimer, the term of this patent is extended or adjusted under 35 U.S.C. 154(b) by 2237 days.

(21) Appl. No.: 11/546,490

(22) Filed: Oct. 10, 2006

(65) Prior Publication Data

US 2008/0086505 A1   Apr. 10, 2008

(51) Int. Cl.
*G06F 9/44* (2006.01)
*G06F 9/45* (2006.01)

(52) U.S. Cl.
CPC .................................. *G06F 9/4445* (2013.01)
USPC .......................................... 717/121; 717/139

(58) Field of Classification Search
USPC .................................................. 717/121, 139
See application file for complete search history.

(56) References Cited

U.S. PATENT DOCUMENTS

| | | | |
|---|---|---|---|
| 6,990,653 B1 * | 1/2006 | Burd et al. ..................... | 717/108 |
| 7,614,052 B2 * | 11/2009 | Wei ................................ | 717/176 |
| 7,707,563 B2 * | 4/2010 | Wei ................................ | 717/140 |
| 2005/0039165 A1 * | 2/2005 | Wolff et al. ..................... | 717/114 |
| 2005/0246694 A1 * | 11/2005 | Soderberg et al. ............. | 717/143 |
| 2005/0251788 A1 * | 11/2005 | Henke et al. ................... | 717/109 |
| 2007/0055964 A1 * | 3/2007 | Mirkazemi et al. ............ | 717/140 |

OTHER PUBLICATIONS

European Patent Application 1582975, date of publication: Oct. 5, 2005.*
Lott et al. (A Beginner's Look at ActionScript, web article dated Dec. 9, 2005, retrieved Mar. 18, 2011, URL: http://www.adobepress.com/articles/printerfriendly.asp?p=428214.*
XML Markup Languages for User Interface Definition, web article dated Oct. 3, 2005, retrieved Mar. 21, 2011, URL: http://xml.coverpages.org/userInterfaceXML.html.*

* cited by examiner

*Primary Examiner* — Li B Zhen
*Assistant Examiner* — Hang Pan
(74) *Attorney, Agent, or Firm* — Mintz Levin Cohn Ferris Glovsky and Popeo, P.C.

(57) ABSTRACT

Methods and apparatus, including computer program products, to present user interfaces in an application based on messages received at the application. An application may execute in a virtual machine (e.g., in an ADOBE FLASH PLAYER) and receive a message characterizing a user interface component. Thereafter, one or more elements of the application may be bound with the user interface component, the elements of the application may be populated with the information for the user interface component, and the user interface component may be presented, to a user, with at least a portion of the information for the user interface component.

18 Claims, 4 Drawing Sheets

PRESENTING USER INTERFACES BASED ON MESSAGES

BACKGROUND

The present disclosure relates to data processing by digital computer, and more particularly to presenting user interfaces in an operating environment, similar to, or being, an ADOBE FLASH PLAYER environment, based on messages received at an application.

In general, in a client/server environment, a client program may receive information from a server program and present that information such that a service is offered to a user. The information may be presented to a user through a user interface that is part of the client program. For example, a reporting application may be offered by a server program and a client program may connect to the server to obtain information computed by the server program that relates to customer and supplier debts. The client program may use a chart user interface component to display the information at the client program. The user interface of the client program is used to display information sent from a server.

SUMMARY

The present disclosure provides methods and apparatus, including computer program products, that implement techniques for presenting user interface components of applications based on messages received at the applications.

In one aspect, a first application executes in a virtual machine and receives a first message characterizing a user interface component. Thereafter, one or more elements of the first application are bound with the user interface component, the elements of the first application are populated with information for the user interface component, and the first application presents to a user the user interface component with at least a portion of the information for the user interface component. The first message may include a characterization of a type of a user interface component to be presented by the first application and information for the user interface component.

In another aspect, a request for services is received from a client application, and a message is generated that includes a characterization of a type of user interface component and information for the user interface component. The request is from a client application running on a virtual machine, and the client application includes a first module to interpret messages that include characterizations of types of user interface components and information for the user interface components. In addition, the client application includes a second module to bind user interface components of the types indicated by the characterizations with first elements of the client application. The message that is generated enables the client application to present to a user the user interface component with at least a portion of the information for the user interface component. In variations, the client application may receive the message, one or more second elements of the client application may be bound with the user interface component, the second elements of the client application may be populated with the information for the user interface component, and the client application may present to a user the user interface component with at least a portion of the information for the user interface component.

In another aspect, a request for services is generated and received by a server application. Thereafter, the server application generates a first message that includes an indication of a type of first user interface component and data corresponding to the first user interface component. The client application receives the first message, binds elements of the client application with the first user interface component corresponding to the type of first user interface component indicated by the data, populates the elements of the first application with the data corresponding to the first user interface component, and presents to a user the first user interface component with at least some of the data. The request is generated by a client application running on a virtual machine and the first message is generated based on the request for services.

In another aspect, a first application executes in a virtual machine, and downloading of first data to the first application is initiated. The first data is interpreted in accordance with a tree-structured format to generate the user interface component, and the first application presents to a user the user interface component. The first data is formatted in accordance with the tree-structured format and the first data includes second data indicating a user interface component to be presented by the first application. The interpreting is performed by the first application.

In another aspect, a system includes a software engine to interpret a tree-structured format of data and a presentation engine to generate a user interface. The data includes a specification of a user interface component. The user interface includes the user interface component.

In another aspect, a system includes a first, second, and third module at a client computer system. The first module is to interpret messages including characterizations of types of user interface components and information for the user interface components. The second module is to bind user interface components of the types indicated by the characterizations with elements of the client application. The third module is to present to a user the user interface components with at least a portion of the information for the user interface components. The first, second, and third modules may be part of a client application and the system may further include a server application to interpret requests for services from the client application and generate the messages including characterizations of types of user interface components and information for the user interface components.

In another aspect, a system includes a client and a server application. The client application includes a user interface control factory, a binding manager, a protocol interpreter, a context data manager, an event dispatcher, and a protocol generator. The user interface control factory may generate user interface controls (e.g., by determining ADOBE ACTIONSCRIPT controls corresponding to controls described in a message received by the client application and causing those controls to be generated) to be bound to context elements of a client application (and, e.g., to update information in controls).

A binding manager may bind (e.g., generate a mapping between) user interface controls generated by the user interface control factory to context elements. A protocol interpreter may interpret a protocol (e.g., a format) of messages received by the client application (e.g., by traversing a message and building a document object model or screen structure corresponding to data in the message; by determining types of user interface controls characterized by the message and data for the user interface controls; by populating context elements with the information for the user interface controls and other data in the message; and the like). A context data manager may manage context data in context elements (e.g., by generating context elements, by populating context elements with context data, by updating controls with information from context elements that have changed, and the like). An event dispatcher may generate selectively requests for services from a server in response to interaction (e.g., user interaction). A protocol generator may generate messages in accordance with a protocol (e.g., the same protocol from which messages are received or another protocol; e.g., generate messages in response to an event dispatcher indicating data to be sent to a server application). The server application may include a protocol interpreter and generator, and server application logic. The protocol interpreter and generator may interpret messages from the client application and generate messages to be sent to the client application, respectively. Messages to be sent to the client application may include characterizations of user interface components to be displayed at the client application and information for the user interface components (e.g., information to be displayed and information that is used to generate information that is to be displayed, such as control logic and data to be used by control logic). Server application logic may respond to requests for services from the client application, and compute types of user interface components and information for the user interface components that respond to the requests for services (and, e.g., that are given to the protocol generator for generating messages to the client application).

Variations may include one or more of the following features.

The first application or the client application may be compiled in bytecode in accordance with an object-oriented programming language compliant with the ECMASCRIPT language specification, such as ADOBE ACTIONSCRIPT bytecode (e.g., compiled from a program written in accordance with the ADOBE ACTIONSCRIPT programming language version 2.0, 3.0, or newer versions; ACTIONSCRIPT being an object-oriented programming language compliant with the ECMASCRIPT language specification, such as version 3.0 of the specification). The virtual machine may be a virtual machine that interprets the bytecode, such as ADOBE ACTIONSCRIPT bytecode (e.g., ADOBE ACTIONSCRIPT VIRTUAL MACHINE version 1 or 2, referred to as AVM1 or AVM2, respectively, or newer versions, or third-party implementations). The virtual machine may execute in another virtual machine, such as an ADOBE FLASH PLAYER (e.g., ADOBE FLASH PLAYER 8.0, 9.0, or newer versions), which may execute in a web browser (e.g., as a plug-in).

The user interface component characterized in a message may be a user interface control. A message (e.g., the first message) may characterize multiple types of user interface components. Binding may include binding additional elements of an application (e.g., the client application or the first application) with user interface components. Populating may include populating additional elements of the first application with information for multiple user interface components.

A message may further characterize control logic for the user interface component, a layout of the user interface component, and the like.

A message may be in a tree-structured format and a method may further include, or a client application of a system may further perform, interpreting the first message in accordance with the tree-structured format to determine the type of the user interface component characterized by the first message.

A method may further include, or a client application may further perform, causing a second message to be sent to enable a second application to respond with the first message and the second message may be formatted in accordance with a tree-structured format.

The first message may be sent from a server application providing one or more services to be obtained through the user interface component.

Messages (e.g., the first message) that include characterizations of user interface components may be sent from a server application being SAP WEB DYNPRO application server. Messages may be sent in accordance with the Smart Client extensible Markup Language protocol.

The user interface component may be presented such that information in the user interface component may be interpreted by a screen reader (e.g., JAWS by FREEDOM SCIENTIFIC).

The first message (e.g., the message) may include personalization information to enable personalization of the user interface component for an application (e.g., the first or client application).

The user interface component may be a part of an analytics service offered by a server. Generating the user interface component may be performed by a server application providing one or more services to be obtained through the user interface component.

Any of the above aspects may be implemented in one or more computers., e.g., as a computer-implemented method. Computer-program products, embodied on tangible media, may be operable to cause data processing apparatus to perform operations of the above aspects.

The subject matter disclosed herein may be implemented to realize one or more of the following advantages. Graphical user interfaces may be presented in a client application based on messages sent from a server application such that a client application need not be recompiled. For example, a client application may interpret a description of a user interface from one or more messages and the client application may act like a shell application that causes the user interface to be generated, and a new application containing the user interface of the description need not be compiled. The client application may be compiled for execution on an ADOBE ACTIONSCRIPT virtual machine (e.g., including ACTIONSCRIPT VIRTUAL MACHINE 2 or a third-party virtual machine that executes ACTIONSCRIPT bytecode). Performance of client applications may improve by avoiding compiling ACTIONSCRIPT client applications for a new user interface. In addition, by avoiding compiling and resending entire applications, a "flicker free" user experience may be provided.

User interfaces to be generated in an ADOBE FLASH environment need not be fixed prior to deployment of an application on a client. In an ADOBE FLASH PLAYER environment, complete applications may be written on a server, compiled into a binary image, and then executed on a client in a FLASH PLAYER. The binary images may have static user interfaces, that, once developed at the server and compiled, are static also in their binary image of what they present as user interface. In contrast to having a static user interface, messages may be used to describe how a user interface should look (e.g., in accordance with a protocol that may be used to describe user interfaces), and a user interface may be generated by a client in a fashion that may be referred to as generating a user interface dynamically. Those user interfaces may generated, based on the messages, from an application compiled in ADOBE ACTIONSCRIPT bytecode, and that application may be the only portion of client-side code that need be precompiled for an ADOBE FLASH PLAYER environment.

Also, as user interfaces may be dynamically generated and a server application may compute screens dynamically such that user interfaces for scenarios might not be precompiled, a dynamic generation of user interfaces that avoids compiling to generate an appropriate user interface may be advantageous. For example, SAP WEB DYNPRO screens may be dynamically composed at runtime, making it impossible to create a compiled presentation of the screen before the application is started; thus, dynamic creation of controls via ACTIONSCRIPT would avoid having to compile a new ACTIONSCRIPT application for freshly-computed screens.

The client application may interpret a description of a user interface from a protocol that is device and operating-environment independent and translate the description to a native environment such that a user interface similar to user interfaces presented in other operating environments may be achieved (e.g., so client user interfaces for services are very similar, if not identical, across operating environments).

As screens can be computed by a WEB DYNPRO application server (e.g., SAP WEB DYNPRO application server 6.4 for JAVA or ABAP ("Advanced Business Application Programming")) using a protocol that may be platform-independent, a same message may be used by a variety of client platforms that may interact with a WEB DYNPRO application server in addition to a client for an ADOBE FLASH environment. For example, a WEB DYNPRO application server may interact with a JAVA-platform client and a FLASH PLAYER-platform client using a same message whose content is not adapted for either type of client (e.g., as each client may generate user interface components based on messages formatted in accordance with a protocol).

By interpreting a user interface description and generating a user interface on a client application, resource burdens may shift from a client to a server such that a client application may be lightweight (e.g., low processor and memory usage). For example, user interaction with a user interface of a client application may be propagated to a server unless responses to the interaction can be executed locally without affecting control logic of an application. For example, a table with no events related to sorting need not require a server round trip to perform a sorting (as there is nothing to sort). As anther example, client-side input field checking (based on an input field's type) need not be propagated.

As a client application can interpret and generate a variety of user interfaces, a same client application may be generic such that the application may be used to access a variety of different services by generating an appropriate user interface based on messages. For example, an analytics application and employee self-service application may be accessed using a same client application and the client application need not be specially designed for either (e.g., as primitive user interface components, such as user interface controls, may be shared among many applications and an appropriate combination of user interface components may be described by one or more messages sent to the client application).

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

In general, FIGS. 1-4 relate to generating a graphical user interface of a client. As used in reference to features of FIGS. 1-4, clients are clients in the sense of being client programs (e.g., client applications; e.g., a client program having a client/server relationship with a server program); although, the term client, as used herein, may refer to a client system (e.g., a computer system where a client program resides and the computer system having a client/server relationship with a server computer system). In any case, a client program may be referred to as a tool (e.g., a computer program), and, that tool may be used to access services offered by a server program. Also, a client program may be made of one or more computer programs (e.g., a client program may be an amalgamation of multiple programs). Similarly, the term server may be used in the sense of being a server program; although, the term server, as used herein, may refer to a server system (e.g., a computer system where a server program resides). A computer system may be a client system or server system by having a client or system program, respectively, residing on the computer system, where, from the view of the relationship of a client and server program, a client/server relationship may exist. A computer system need not be only a client system or a server system. For example, for one set of client and server programs, a computer system may be a client system by having a client program; yet, the computer system may be a server system by having a server program from another set of client and server programs. Although some of the figures depict a single server, a client/server system need not be limited to one server. Also, a client/server system may have periods during which clients and servers are not connected to each other. Similarly, a client need not be connected to a server to be considered a client (e.g., a client may be developed for use in obtaining services without a specific server being considered).

Also, as used in reference to features of FIGS. 1-4, controls are user interface controls, which may be user interface components that may be manipulated through user interaction and may provide output to a user. Controls may relay user-generated input to other components of a computer program (or other computer programs) or may have associated logic which performs processing of input received as user interaction and transforms that input to other types of output. As examples, a text box may receive a number value that is relayed as-is to another component of a client, or a text box may have associated logic that transforms numerical input to a normalized value and relays the normalized value to another component of a computer program.

Figure 1:
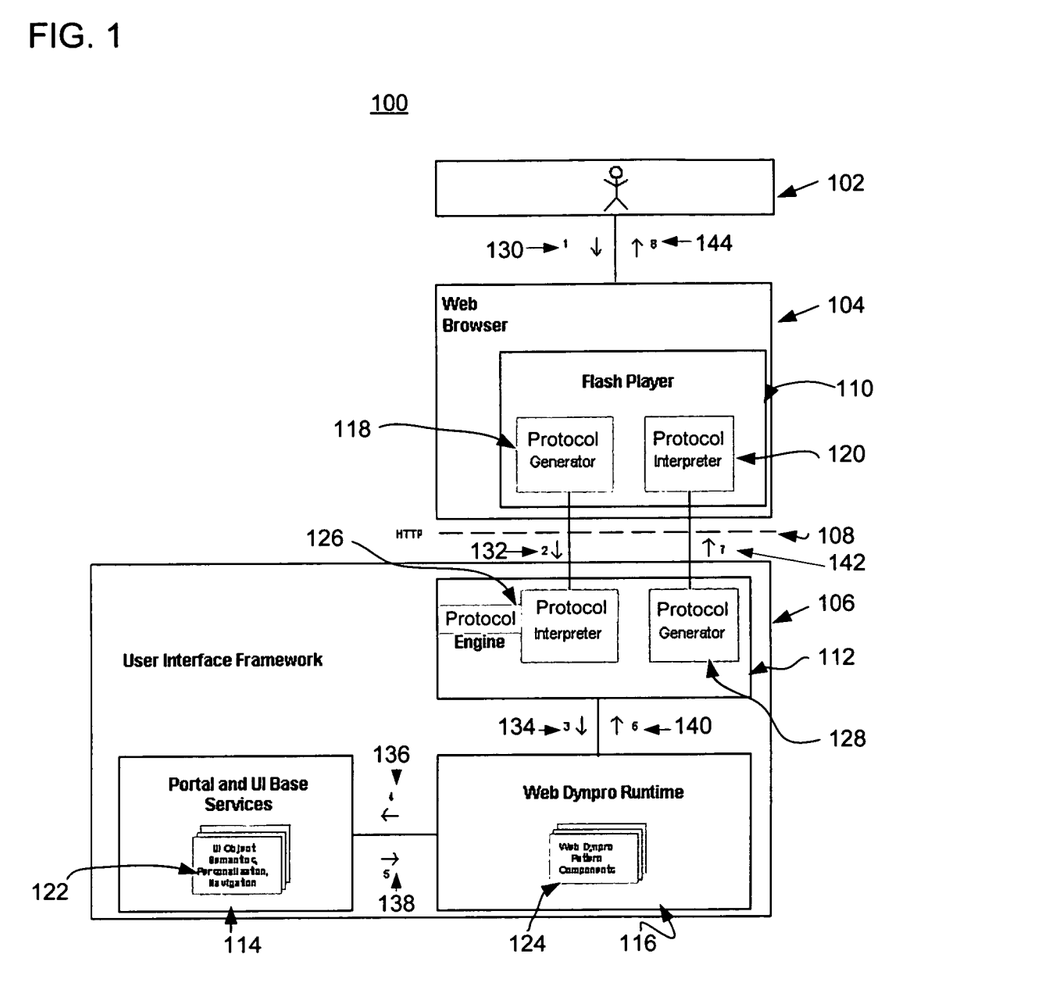
FIG. 1 is a diagram of a system including a web browser that may communicate with a user interface framework over a network.

FIG. 1 is a diagram of a system 100 including a web browser 104 that may communicate with a user interface framework 106 over a network 108. In general, a user 102 may interact with the web browser 104 to access services of the user interface framework 106. The user interface framework 106 may respond to requests for services by computing user interfaces to be displayed on a client application and sending information to the client application from which a user interface may be formed. An example series of interactions that includes the user 102 interacting with the web browser 104 to access services offered by the user interface framework 106 is indicated by the directional arrows 130-144.

The series of interactions commencing with the first arrow 130 may include the user 102 interacting with a client application running in the web browser 104. The client application of the example runs in the FLASH PLAYER 110 of the web browser 106. In response to some user interactions, the protocol generator 118 running in the FLASH PLAYER 110 may generate a message that is transmitted to a corresponding protocol interpreter 126 of the user interface framework 106 (e.g., due to certain events determined to cause a message to be sent, e.g., as a request for services), as indicated by the second arrow 132. The protocol interpreter 126 may interpret the message, and information derived from a message (e.g., derived by parsing the message in accordance with a protocol adhered to by the protocol generator 118 of the client application) may be sent to the WEB DYNPRO runtime 116, as indicated by the third arrow 134. The WEB DYNPRO runtime 116 is a component of a server program that computes responses to requests for services. The responses may include information from which the client application may derive an update to a user interface or new user interface. The WEB DYNPRO runtime 116 may determine whether information responsive to the message may be formed by the WEB DYNPRO runtime 116. In some instances, the WEB DYNPRO runtime 116 may use resources to form a response (e.g., by contacting the portal and user interface base services 114, as indicated by the fourth and fifth arrows 136, 138). A response to a request computed by the WEB DYNPRO runtime 116 may be sent to the protocol engine 112, as indicated by the sixth arrow 140, for generating a message in accordance with a protocol by the protocol generator 128, as indicated by the seventh arrow 142. The corresponding protocol interpreter 120 of the client application may derive information from the message to generate a user interface to be displayed to the user 102, as indicated by the eight arrow 144.

As discussed above, the user interface framework 106 may respond to requests for services by computing user interfaces to be displayed on a client application and sending to the client application information from which a user interface may be generated (e.g., by updating or changing existing user interface components, removing user interface components, adding user interface components, or any combination). In particular, the FLASH PLAYER 110 may run a client application that includes the protocol generator and interpreter 118, 120. The protocol interpreter 118 may be the component of the client application that interprets descriptions of user interfaces to be generated by the client application through the FLASH PLAYER 110. Because the client application with the protocol interpreter 118 may generate user interfaces based on messages sent to the client application and the client application may already be running on the FLASH PLAYER 110, the user interfaces generated by the client application may be dynamically generated. For example, instead having various FLASH PLAYER applications for combinations of user interface components or having a FLASH PLAYER application that utilizes many resources (e.g., utilizing a lot of memory due to many user interfaces being part of the client application), the FLASH PLAYER application may simply be a shell from which new user interfaces are generated in response to messages from a server program rather than being part of the FLASH PLAYER application. Similarly, rather than compiling a new FLASH PLAYER application for combinations of user interface components and sending a newly compiled FLASH PLAYER application, a single client application need only be generated once and that application may act as a shell or generic application that may generate new user interfaces based on messages received from a server program. Advantageously, performance may improve, as, for example, a new FLASH PLAYER application need not be generated in response to server requests that require a different user interface from the user interfaces available on a client application; rather, the shell or generic application may interpret messages during runtime to generate new user interfaces.

Although not shown, the protocol generator and interpreter of the client application running on the FLASH PLAYER 110 may be implemented in ADOBE ACTIONSCRIPT which may run on an ADOBE ACTIONSCRIPT virtual machine of the FLASH PLAYER 110. Implementation in ADOBE ACTIONSCRIPT may provide for generation of messages in accordance with a protocol, interpretation of a protocol, and generation of user interfaces.

As discussed above, the WEB DYNPRO runtime 116 may be a component of the server program and that component may be used to compute user interface components to be displayed in a client application. The server program may be the user interface framework 106 that includes the protocol engine 112, the WEB DYNPRO runtime 116, and the portal and user interface base services 114. To compute user interface components to be displayed in a client application, the WEB DYNPRO runtime includes user interface pattern components 124 that may be referenced for a logical model of a service.

As discussed above, a protocol may be used for sending messages between a client application and the user interface framework 106. The protocol may be designed for communicating information about user interfaces. For example, the protocol may define a format for describing types of user interface components (e.g., user interface controls) and information for the user interface components (e.g., data to be displayed in a user interface component or control logic for a user interface component). The protocol may define a tree-structured format that has a hierarchical organization of elements in a message according to a tree structure. For example, the protocol may be a derivative of extensible Markup Language ("XML"). An example of such a protocol may be SAP's Smart Client extensible Markup Language protocol, also referred to as the WEB DYNPRO PROTOCOL (described, in part, in "An Introduction to the Web Dynpro Protocol," Dipak Chopra, SAP AG) or BCXML, which is an HyperTextTransferProtocol based protocol that has an XML body, allows for requests of partial amounts of data (e.g., a portion of data for a user interface, rather than entire user interface), and may be used to synchronize a server instance of a user interface object tree with the client instance (e.g., a client request and server response may refer to a same user interface object model). Although a same protocol is used in FIG. 1 for communications from a client application and communications to a client application, a client application may send messages according to a protocol that differs from a protocol used for receiving messages.

Messages sent to the user interface framework 106 may characterize a request for services. For example, a message may indicate that a user clicked a submit button having a certain name and that message may characterize that a user wishes to continue with a process that involves a new user interface. Not all messages sent to the user interface framework 106 need result in a response, or a response that includes information describing user interface components (e.g., a response may include only context data).

Messages from the user interface framework 106 may use a variety of information to describe user interface components. For example, the messages may describe a layout of user interface components, types of user interface components to be included according to that layout, logic for the user interface components (e.g., a function to be computed client-side as a result of user interaction; an event to be triggered based on user input, such as an event causing a request for services to be sent; and the like), and information to be presented in user interface components.

Techniques and mechanisms of FIG. 1 may differ. For example, a virtual machine may execute applications made in accordance with ADOBE FLASH PLAYER or ADOBE ACTIONSCRIPT without being an ADOBE FLASH PLAYER or ACTIONSCRIPT virtual machine, respectively (e.g., a third-party virtual machine). Also, a virtual machine need not run within a web browser, although, a web browser may advantageously allow for content from the virtual machine to be presented in combination with other web content (e.g., images and text in accordance with the HyperText-MarkupLanguage format; results of JAVASCRIPT code execution, and the like) in a single web browser window (e.g., made of one or more web pages).

In variations, a server program to compute dynamic user interfaces for a client application running on a virtual machine may have fewer, additional, and different components in contrast to the user interface framework 106 of FIG. 1. For example, the portal and user interface base services 114 need not be included. As another example, a WEB DYNPRO runtime 116 need not be used to compute responses to requests for service. For example, instead of the WEB DYNPRO runtime 116, another type of server runtime may be used to compute responses to requests for service, generate a description of a user interface for a client, generate a message including the description, and the like. Features of a server program to compute user interfaces for a client application may include fewer, additional, or different features of WEB DYNPRO, which includes the features of an application model based on the Model View Controller paradigm, separation of business logic and display logic (e.g., a separation of backend services and user interfaces), a uniform metamodel for all types of user interfaces, platform independence of interfaces, having an application generated at runtime from a metamodel describing the application (e.g., such that metadata itself is independent of the rendering technique used at runtime; e.g., when an application is developed, a platform-independent metamodel is generated such that, for example, messages describing the user interfaces of the application can be generated from the metamodel), support for stateful applications (e.g., if a page is changed, required data remains intact such that the data may be accessed at any time throughout an entire application context), a declarative approach to modeling (e.g., instead of programming, layout, screen usage, navigation, and data binding; e.g., a user interface may be configured, rather than programmed, through user interface patterns), portal integration (e.g., applications may be seamlessly integrated into the look and feel of a portal page having user interfaces with a similar appearance and behavior as FLASH interfaces displayed by a client application), and a graphical development environment.

Figure 2:
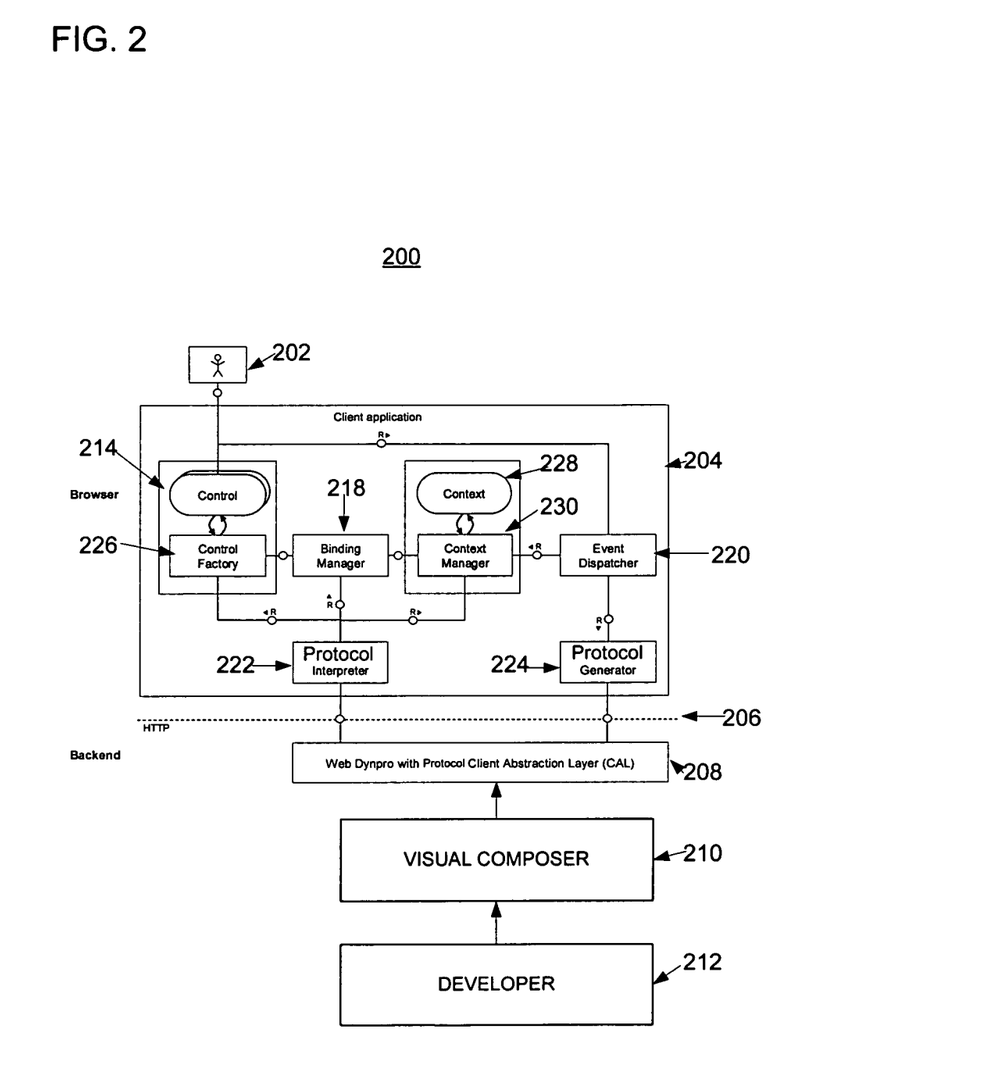
FIG. 2 is a diagram of a client application for a virtual machine of a web browser, and a backend system.

FIG. 2 is a diagram of a system 200 including a client application 204 for a virtual machine of a web browser, and a backend system 208. In general, a user 202 may interact with the client application 204 such that the client application 204 sends requests for services to the backend system 208 via a network 206 using HyperText Transfer Protocol. The backend system 208 may respond with a message including a description of a user interface for the client application, such as change, addition, or removal of user interface components. The client application 204 may be the client application executing in the FLASH PLAYER 110 of FIG. 1 and the backend system 208 may be the user interface framework 106 of FIG. 1.

The user 202 may be an end-user of a web browser such as an employee of a financial reporting company that accesses analytics applications through a web portal in combination with other applications and web content that may be displayed in a single web browser window. In that example, the analytics application may be an application generated through the client application 204.

The client application 204 may execute above two levels of virtual machines of a web browser. For example, the client application 204 may be an ADOBE ACTIONSCRIPT application such that the client application 204 executes in the ADOBE ACTIONSCRIPT virtual machine which executes in a FLASH PLAYER virtual machine of a web browser. By being implemented in ADOBE ACTIONSCRIPT, the client application may have more functionality that might otherwise be available through a normal application executing in a FLASH PLAYER virtual machine. For example, a greater variety of user interface controls may be generated and the client application may implement a protocol interpreter for interpreting data that describes a user interface to be presented to a user.

The client application 204 includes a protocol generator 224, a protocol interpreter 222, a control factory 226, controls 214, a binding manager 218, a context manager 230, context elements 228 (which may be used for storing data that is not viewable directly by an end-user), and an event dispatcher 220. The protocol generator and interpreter 224, 222 may be used to send and receive messages in accordance with a protocol and may be the same as the protocol generator and interpreter 118, 120 of FIG. 1. The protocol generator 224 may be used to send requests for services to the backend 208 which may respond with messages that include descriptions of user interface components that may be interpreted by the protocol interpreter 222. The protocol interpreter 222 may interpret the messages to derive a layout of user interface components, types of the user interface components, bindings for the user interface components to context elements 228 of the client application 204, and context data for the context elements 228. To derive information about user interface components, the protocol interpreter 222 may parse a message to generate a model of a message, for example, a tree structure corresponding to a tree-structured format of data in the message. Based on the protocol, the protocol interpreter 222 may relay appropriate information to the control factory 226, binding manager 218, and context manager 230. In addition, the protocol interpreter 222 may respond to requests for information contained in a message from the control factory 226, binding manager 218, and context manager 230. For example, the control factory 226 may interact with the binding manager 218 to inform the binding manager 218 that a new control needs to be bound to a context element and the binding manager 218 may request information about the binding from the protocol interpreter 222. In variations, any combination of pushing or pulling information among the control factory 226, binding manager 218, context manager 230, and protocol interpreter 222 may be implemented.

As an example of interactions of the protocol interpreter 222, a message that is received by the protocol interpreter 222 may include a description that a text field is to be included in an upper-right corner of a user interface, the text field is to be bound to a context element named "textField," and default text to be presented in the text field is to include "HelloWorld." The protocol interpreter 222 may derive the layout and type of user interface component from that message and send that information to the control factory 226 which generates a user interface component in accordance with that description. In addition, the protocol interpreter 222 may send the binding information to the binding manager 218 which generates a binding to the context element, and the protocol interpreter 222 may send the context data to the context manager 230 for populating the context element.

The control factory 226 may be used to generate user interface controls and other types of user interface components, or modifying user interface components. Generating a control may add a control to the controls 214 of the client application. Modifying may include removing or updating existing controls 214 of the client application.

The binding manager 218 may generate or modify (e.g., changing or removing) bindings between controls 214 of the client application 214 and context elements 228. Bindings are generated or modified in accordance with a description of a binding in a message received by the protocol interpreter 222.

The context manager 230 may generate context elements 228 or populate context elements 228 with data (e.g., populating context elements 228 with data from a message received by the protocol interpreter 222 or based on user input, e.g., by updating context data of a context element). In addition, the context manager 230 may assist in updating information presented in a user interface component (e.g., by responding to requests for data in context elements).

The event dispatcher 220 may receive event information from a user interface control, context data, or both, and generate a request for the protocol generator 224 to generate a request for services. For example, in response to a user pressing a submit button, the button may send data characterizing the event to the event dispatcher 220 and the event dispatcher 220 may determine that a message is to be generated, so the event dispatcher 220 may cause the protocol generator 224 to generate a message requesting services from the backend 208. As the event dispatcher 220 need not cause the protocol generator 224 to generate a request for services in all instances, the event dispatcher 220 may selectively cause messages to be generated.

The services offered by the backend 208 may be generated by a developer 212 with the use of a visual modeling tool, such as SAP's VISUAL COMPOSER 210. When a runtime version of a server application is generated by VISUAL COMPOSER 210, different types of clients may interact with the server application. For example, the backend 208 may include a server application and the client application 204 may communicate with the backend 208 to access services, and, another client might be compiled for a JAVA virtual machine and also communicate with the same server application. As a protocol is used to describe user interface components that are to be used in a client application, each client application may interpret the protocol diversely and generate respective user interfaces that are composed of different user interface components.

In variations, components of the client application 204, such as the protocol interpreter 222, may translate information about user interface components to user interface components that are native to the environment (e.g., virtual machine) of the client application 204. For example, a message may refer to a text box user interface control as "TextBox" whereas text boxes are referred to as "text_box" by the client application to generate a text box through the virtual machine. In variations, a translation may include a one to many or many to one correspondence. For example, a chart object in a message may be generated with a combination of user interface controls by the client application 204.

Although the client application 204 has a certain number and type of components, variations may include additional, fewer, or different components.

Figure 3:
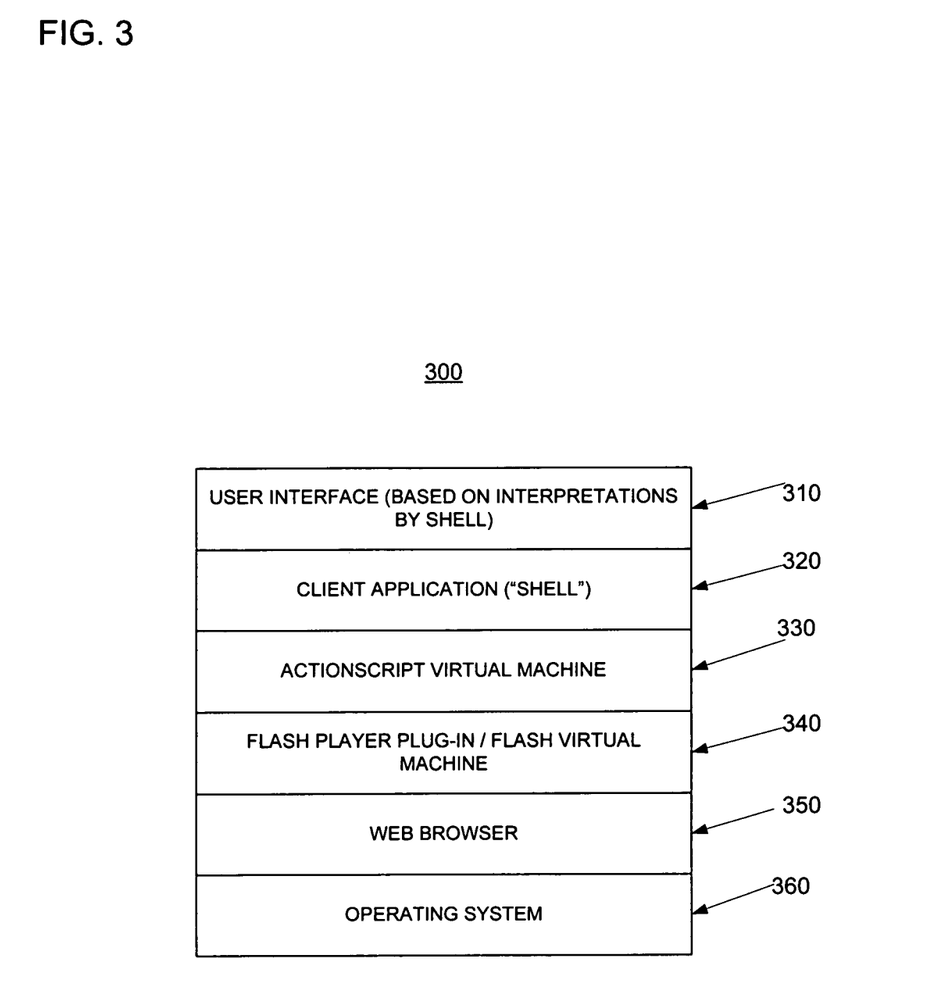
FIG. 3 is a diagram of layers of execution for an application that has a user interface generated by a client application.

FIG. 3 is a diagram of layers of execution 300 for an application that has a user interface 310 generated by a client application 320. The layers of execution 300 may represent the layers of execution for the client application 204 of FIG. 2. The layers include an operating system 360, a web browser 350, a FLASH PLAYER plug-in 340, an ACTIONSCRIPT virtual machine 330, a client application 320, and a user interface 310 (which may include control logic).

The operating system 360 may be an operating system such as WINDOWS XP or any other operating system. The web browser 350 executes above the operating system and includes a FLASH PLAYER plug-in 340 which may also be referred to as a FLASH virtual machine. The FLASH PLAYER plug-in 340 works with an ACTIONSCRIPT virtual machine 330 to interpret programs compiled in accordance with a bytecode format for the ACTIONSCRIPT virtual machine 330.

The client application 320 may be referred to as a shell or generic application because the client application 320 interprets messages describing user interfaces (e.g., as the client application 204 may interpret messages describing user interfaces) to generate a user interface that results from the execution of the ACTIONSCRIPT virtual machine 330. As the client application 320 interprets messages to generate the user interface 310, the user interface 310 may change without requiring the client application 320 to be re-compiled. For example, the client application 320 may be compiled before execution on the ACTIONSCRIPT virtual machine 330 and messages may be received that describe a new user interface, yet, the same client application 320 may be used to interpret the messages and generate a user interface in accordance with a description in the messages.

Figure 4:
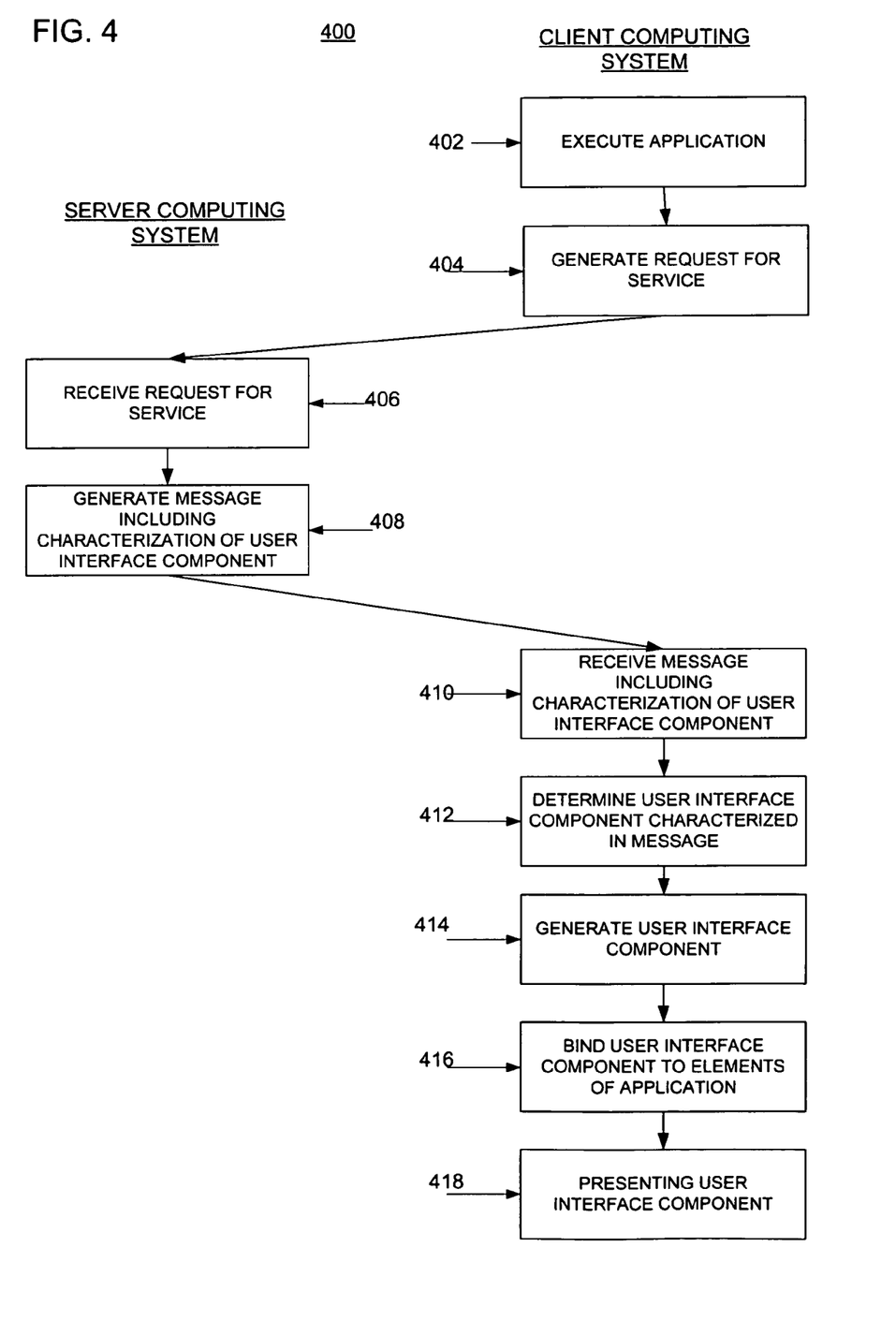
FIG. 4 is a flowchart illustrating a process of presenting a user interface component to a user.

FIG. 4 is a flowchart illustrating a process 400 of presenting a user interface component to a user. The flowchart has two sides, with a left side representing operations performed on a server computing system and a right side representing operations performed on a client computing system.

At 402, an application executes. The application may be the client application 204 of FIG. 2 and the application may execute on an ACTIONSCRIPT virtual machine. A request for services is generated at 404. The request may be generated by the application that is executing or another component of a client computing system. The request for services may be in the form of a message that is in accordance with a protocol that may be interpreted by a server computing system. The request may be in response to an event dispatcher determining that based on user interaction, context data, or both a request is to be generated.

A request for service is received at 406. The request that is received may be the request generated at 404. In response to receiving the request, the request may be interpreted in accordance with a protocol of the request.

A message including a characterization of a user interface component is generated at 408. The type of user interface component and information related to the user interface component, such as layout, a binding of the user interface component to context elements of a client application, context data for the context elements, and control logic to accompany the user interface component may be computed based on information received in the request at 406. For example, in response to a message indicating that a submit button was pressed in combination with context data from a client application indicating that sales for 2004 has been selecting, the server computing system may compute a graphical chart object, a binding of context elements to the chart object, and context data for the chart object that represents sales for the year 2004.

A message including a characterization of a user interface component is received at 410. In variations, the message may include a type of user interface component, layout for the user interface component, a binding of the user interface component to context elements of a client application, context data for the context elements, and control logic to accompany the user interface component, or any combination of that information. Following the example, the message including the chart object, a binding of context elements to the chart object, and context data for the chart object may be received in the message.

A user interface component characterized in a message is determined at 412. Determining the user interface component characterized in the message may include interpreting the message in accordance with a protocol used to generate the message. For example, in variations, the message may be in a tree-structured format and the message may be parsed to derive a type of user interface component, layout for the user interface component, a binding of the user interface component to context elements of a client application, context data for the context elements, and control logic to accompany the user interface component, or any combination of that information.

A user interface component is generated at 414. The user interface component that is generated may be the same, or similar to, the user interface component that is included in the message received at 410. For example, the message may be in a protocol that has a chart object, and a user interface chart object may have a one to one correspondence to a chart object that may be generated. As another example, the message may include a chart object as a single user interface component, and one or more user interface components may need to be generated to compose a comparable chart object.

A user interface component is bound to elements of an application at 416. The user interface component that is bound may be the user interface component that is generated at 414. A user interface component is presented to a user at 418. The user interface component that is presented to a user is the user interface component that is generated at 414.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments may be implemented and are within the scope of the following claims. For example, the operations may differ and still achieve desirable results. In certain implementations, multitasking and parallel processing may be preferable. Other embodiments are within the scope of the following claims.

What is claimed is:

1. A non-transitory computer-program product embodied on tangible media, the computer program product operable to cause data processing apparatus to perform operations comprising:

executing a first application in a virtual machine that processes bytecode, the first application compiled in bytecode in accordance with an object-oriented programming language compliant with a pre-defined language specification, the application comprising a protocol generator to generate and transmit messages comprising requests for services to a backend system, a protocol interpreter to receive and interpret messages from the backend s stem a control factory to generate user interface components, a binding manager, a context manager, and an event dispatcher;

receiving, by the protocol interpreter, a first message at the first application, the protocol interpreter parsing the first message to derive a layout for the user interface component, a binding of the user interface component to one or more elements of the first application, a context data for the one or more elements, and control logic to accompany the user interface component;

relaying, by the protocol interpreter and based on the parsing, information to the control factory, binding manager, and context manager;

binding, by the binding manager, one or more elements of the first application with the user interface component;

populating, by the context manager, the elements of the first application with the information for the user interface component;

presenting, by the first application to a user, the user interface component with at least a portion of the information for the user interface component;
receiving, by the event dispatcher, event information from at least one of the user interface component or the context data; and
causing, by the event dispatcher, the protocol generate generator to generate a message requesting services from the backend based on the event information.

2. A computer-program product in accordance with claim 1, wherein the user interface component is a user interface control.

3. A computer-program product in accordance with claim 1, wherein:
the first message characterizes a plurality of types of user interface components;
the binding comprises binding additional elements of the first application with the plurality of user interface components; and
the populating comprises populating the additional elements of the first application with the information for the plurality of user interface components.

4. A computer-program product in accordance with claim 1, wherein the first message is in a tree-structured format and the operations further comprise interpreting the first message in accordance with the tree-structured format to determine the type of the user interface component characterized by the first message.

5. A computer-program product in accordance with claim 1, wherein the operations further comprise:
initiating transmission of a second message to enable a second application to respond to receipt of the second message by transmitting the first message, the second message formatted in accordance with a tree-structured format.

6. A computer-program product in accordance with claim 1, wherein the first message is sent from a server application executing on the backend server providing one or more services to be obtained through the user interface component.

7. A method for implementation by at least one data processor forming part of at least one computing system, the method comprising:
executing, by at least one data processor, a first application in a virtual machine that processes bytecode, the first application compiled in bytecode in accordance with an object-oriented programming language compliant with a pre-defined language specification, the application comprising a protocol generator to generate and transmit messages comprising requests for services to a backend system, a protocol interpreter to receive and interpret messages from the backend system, a control factory to generate user interface components, a binding manager, a context manager, and an event dispatcher;
receiving, by the protocol interpreter, a first message at the first application, the protocol interpreter parsing the first message to derive a layout for the user interface component, a binding of the user interface component to one or more elements of the first application, a context data for the one or more elements, and control logic to accompany the user interface component;
relaying, by the protocol interpreter and based on the parsing, information to the control factory, binding manager, and context manager;
binding, by the binding manager, one or more elements of the first application with the user interface component;

populating, by the context manager, the elements of the first application with the information for the user interface component;
presenting, by the first application to a user, the user interface component with at least a portion of the information for the user interface component;
receiving, by the event dispatcher, event information from at least one of the user interface component or the context data; and
causing, by the event dispatcher, the protocol generate generator to generate a message requesting services from the backend based on the event information.

8. A method in accordance with claim 7, wherein the user interface component is a user interface control.

9. A method in accordance with claim 7, wherein:
the first message characterizes a plurality of types of user interface components;
the binding comprises binding additional elements of the first application with the plurality of user interface components; and
the populating comprises populating the additional elements of the first application with the information for the plurality of user interface components.

10. A method in accordance with claim 7, wherein the first message is in a tree-structured format and the method further comprises: interpreting, by at least one data processor, the first message in accordance with the tree-structured format to determine the type of the user interface component characterized by the first message.

11. A method in accordance with claim 7 further comprising:
initiating, by at least one data processor, transmission of a second message to enable a second application to respond to receipt of the second message by transmitting the first message, the second message formatted in accordance with a tree-structured format.

12. A method in accordance with claim 7, wherein the first message is sent from a server application executing on the backend server providing one or more services to be obtained through the user interface component.

13. A system comprising:
at least one data processor; and
memory storing instructions which, when executed by the at least one data processor, result in operations comprising:
executing a first application in a virtual machine that processes bytecode, the first application compiled in bytecode in accordance with an object-oriented programming language compliant with a pre-defined language specification, the application comprising a protocol generator to generate and transmit messages comprising requests for services to a backend system, a protocol interpreter to receive and interpret messages from the backend system, a control factory to generate user interface components, a binding manager, a context manager, and an event dispatcher;
receiving a first message at the first application, the protocol interpreter parsing the first message to derive a layout for the user interface component, a binding of the user interface component to one or more elements of the first application, a context data for the one or more elements, and control logic to accompany the user interface component;
relaying, by the protocol interpreter and based on the parsing, information to the control factory, binding manager, and context manager;

binding, by the binding manager, one or more elements of the first application with the user interface component;

populating, by the context manager, the elements of the first application with the information for the user interface component;

presenting, by the first application to a user, the user interface component with at least a portion of the information for the user interface component;

receiving, by the event dispatcher, event information from at least one of the user interface component or the context data; and causing, by the event dispatcher, the protocol generate generator to generate a message requesting services from the backend based on the event information.

14. A system in accordance with claim 7, wherein the user interface component is a user interface control.

15. A system in accordance with claim 7, wherein:

the first message characterizes a plurality of types of user interface components;

the binding comprises binding additional elements of the first application with the plurality of user interface components; and the populating comprises populating the additional elements of the first application with the information for the plurality of user interface components.

16. A system in accordance with claim 7, wherein the first message is in a tree-structured format and the operations further comprise: interpreting the first message in accordance with the tree-structured format to determine the type of the user interface component characterized by the first message.

17. A system in accordance with claim 7, wherein the operations further comprise:

initiating transmission of a second message to enable a second application to respond to receipt of the second message by transmitting the first message, the second message formatted in accordance with a tree-structured format.

18. A system in accordance with claim 7, wherein the first message is sent from a server application executing on the backend server providing one or more services to be obtained through the user interface component.

* * * * *